2,884,060
Patented Apr. 28, 1959

United States Patent Office

2,884,060

METHOD FOR PREPARING A NOVEL CORK COMPOSITION AND PRODUCTS PRODUCED THEREBY

John Y. L. Kao, Lombard, Ill., assignor to F. D. Farnam Co., a corporation of Illinois No Drawing. Application April 16, 1954
Serial No. 432,900

8 Claims. (Cl. 162—169)

The principal objects of the present invention include the following: To coat cork granules with emulsified materials, such as rubber latices, thermoplastic and thermosetting resins, plasticizers, waxes, oils and the like, in such manner that the coating on each cork granule will be even and uniform with each granule being substantially completely coated; to accomplish this in such a way that the coated cork granules are substantially individually separated from each other; to facilitate the moulding of thus coated cork particles so that water can be quickly drained from the mould and so that the time required for drying the stock in the mould will be comparatively short; to coat the cork granules in such a way that they may be readily blended with fibers which have been coated by similar or other processes to produce a composite product having any desired percentage relationship between coated cork granules and coated fibers; and to provide a coating process which enables cork granules, which may be as large as 25 mesh, to be effectively coated.

The above are but some of the objects which the present invention seeks to attain, and others will become apparent as the disclosure proceeds.

In my copending prior application, Serial No. 51,294, filed September 25, 1948, Patent No. 2,676,099, and entitled "Process of Coating Fibers With Gas Agitation," of which the instant application is a continuation-in-part, I have described a process of coating fibers with rubber latices or other coating material to produce a product vastly superior to those resulting from prior art processes. The present invention is closely related to this previously disclosed process, and, for that reason, the entire disclosure of said prior application, Serial No. 51,294, is hereby specifically incorporated by reference, in so far as it is not inconsistent with the present disclosure.

Primarily, I am concerned in the instant invention with the effective coating of discrete cork particles, with materials such as natural and synthetic rubber, thermoplastic and thermosetting resins, plasticizers, waxes, oils and the like, all in the form of emulsions. Also, I am concerned with the blending of such coated cork particles with fibers which have been coated according to the process disclosed in said copending application, Serial No. 51,294, or by any other process. In my prior application, hereinbefore-identified, the process was directed primarily to the coating of fibers with various kinds of emulsified materials, but I have found that in coating discrete cork particles, the process must be varied somewhat in order to achieve desired results.

The present invention also utilizes gas agitation of the same general character as that disclosed in said prior application Serial No. 51,294, but the process is modified in view of the different character of the stock or particles being coated, namely, cork as distinguished from fibers.

In order to have a better understanding of the required variations in the process, it is helpful to first consider the physical and chemical nature of cork.

PHYSICAL AND CHEMICAL PROPERTIES OF CORK

Cork comes from the bark of oak trees which are widely grown in the area around the Mediterranean Sea.

For centuries, cork has been used for sealing wine bottles and for making floats. Since the Nineteenth Century, cork has steadily gained in importance in many industrial applications by virtue of its outstanding physical properties, namely, low density, high compression and resilience, good water resistance and low thermal conductivity.

These striking physical properties, which put cork in a class of its own, are the result of the unusual structural and chemical properties of cork.

Each cubic inch of cork contains approximately 200,000,000 minute cells, each of which is approximately $\frac{1}{1000}''$ in diameter and shaped as a tetrakaidecahedron. Each cell is separated from the other by a thin but strong membrane serving as a shell for each cell. Nature has ingeniously packed together these fourteen-sided cells in such a way that there are no interstices or empty spaces between cells. As a result, cork is normally substantially impenetrable by many fluids.

In each of the minute cells there is a tiny amount of air imprisoned, with the result that approximately 50% of the total volume of cork is air. Due to the fact that the captive stagnant air has low thermal conductivity, cork is rated as a very good insulator. Because air can be compressed upon the application of load, and expanded upon the removal of load, cork has a high degree of compressibility and resiliency. Furthermore, because the amount of air imprisoned in the cells is almost 50% of the total volume, cork has low density with a specific gravity of approximately .25.

The fact that the membrane of the cork cells has a relatively high content of resinous materials and waxes, renders the cells flexible, strong and elastic. For this reason also, cork is highly resistant to the escape of captive air and to the penetration of most liquids including water. The high wax content in the membrane of the cells makes the cork not readily wettable by many liquids including water.

In one of the prior art processes for coating cork granules, it has been necessary to reduce the particle size to approximately 200 mesh (i.e., so that the particles would pass through a 200-mesh screen), but, in reducing the cork to such a small size, many of the desirable physical properties of the cork are lost.

In my improved process for coating cork particles, I have found that I can use cork granules up to 25 mesh in size, and this is a great advantage in preserving the desirable physical properties of the cork.

PROBLEMS INVOLVED IN COATING CORK GRANULES

In my earlier patent application, Serial No. 51,294, I have discussed fully the importance of; first, using low pulp consistency in order to do away with the effects of entanglements, cluster formations and heavy viscosity; second, exposing the surfaces of each fiber in the slurry to enable the coating materials to anchor thereon; and, third, applying gas agitation for the rapid, turbulent movement and mass transfer of the binding materials and coagulants into the system for even, uniform and complete coating of the fibers without any mechanical means to interfere with the process, or to strip coatings from fibers once the coating has attached itself to the fiber. This process has proved to be highly successful for the coating of vegetable, mineral or animal fibers.

However, experience has shown that the use of this process for coating cork granules requires some variations, due to the substantial dissimilarity between pulp fibers and cork granules. Some of these dissimilarities are set forth below:

(1) In the process of the mechanical subdivision or comminuting of cork, the membranes of many of the cells are split open and thus the captive air in the broken cells escapes. As the comminuting process is continued, the amount of air imprisoned becomes less. Nevertheless, the amount of air left in the unsplit cells is sufficient to cause the cork granules to float on water.

(2) Since the mechanical subdivision or comminuting of cork in reducing the cork to the desired particle size does not alter its chemical composition, the cork granules still contain a high percentage of resinous materials and waxes which make them highly water repellent. This in combination with the low specific gravity of cork renders the particles very buoyant which makes coating more difficult.

(3) By means of mechanical subdivision, the surface to volume ratio of the cork granules is, of course, increased. The finer the subdivision, the greater is the surface to volume ratio, which in turn produces more surface to be wetted and more surface on which the coating materials may anchor. However, it should be recognized that the finer the subdivision, the more the cork granules sacrifice their most useful physical characteristics.

(4) In dispersing pulp, for instance, vegetable pulp, in water, the pulp absorbs water and readily disperses to form a slurry, but in dispersing cork granules in water there is a real problem, because cork granules absorb little or no water, and there is a strong tendency for the cork granules to float to the top of the water. Hence, cork granules cannot form a slurry as easily as pulp.

(5) Since the density of cork granules is much less than that of pulp, a given weight of cork occupies a much larger volume than an equal weight of pulp.

(6) Since the structural shape of the cork granules is so different from the cylindrical shape of fibers, and since their densities are so different, it is obvious that the patterns of motion, friction, etc., of a cork slurry, when subjected to gas agitation, are materially different from a gas agitated pulp slurry.

(7) While fibers dispersed in water are generally believed to be electrically charged, it is believed that cork granules dispersed in water are relatively less electrically charged, if charged at all.

(8) In dispersing cork granules in water, if the surface is well wetted, it is believed that the surface of the granules is subjected to adsorption phenomena.

IMPROVED PROCESS FOR COATING CORK GRANULES

In my improved process for coating cork granules, I may either deal only with cork granules, or I may coat a given quantity of cork granules, and then blend them in desired proportions with fibers which have been separately coated with similar or different coating materials. I shall first describe the process and apparatus for coating cork granules.

Cork granules, which have been reduced in size by any suitable means so that they will have a size of 25 mesh or finer, are placed in an agitation tank and mixed with water in such proportion that the cork granules constitute not more than about 2% by weight of the admixture of water and granules. Preferably, it is desirable for the concentration of this admixture to be less than 1% by weight, because of the low density of cork and the large volume per unit weight of the cork granules.

Although the cork granules may be as large as 25 mesh, in practice it is found preferable to use granules ranging from say 40–60 mesh, or even finer. In speaking of granules of a given mesh size is meant granules which will just barely pass through a screen of the specified mesh. However, in speaking of cork granules that will pass through a screen of given mesh, say 40, by way of example, is meant commercial grades of cork granules which have no particular sizes larger than those which will pass through a 40 mesh screen. The screenings from the 40 mesh screen will obviously contain particle sizes from dust up to the 40 mesh size.

The tank is preferably a cylindrical vessel set upright with the side walls tangent to or at least forming a smooth, curved connection with the concave bottom wall of the tank so that there are no sharp corners or crevices within the tank which could create dead spots or local eddy currents which might disturb or interfere with the regular and even dispersion and movement of the cork granules within the water as the mixture is gas agitated. For example, the agitation tank may be cylindrical in form and have a semi-spherical bottom which would provide the smooth contours desired for the type of gas agitation which is required in the practice of my process.

Agitation is not carried out by any mechanical device, but instead is accomplished solely by gas which is allowed to bubble upwardly through the cork slurry to provide both mass and turbulent movements of all parts of the slurry. The gas is introduced through strategically located outlets in the bottom wall of the tank, and, preferably, they are located so that the entire body of the cork slurry will be continuously agitated and given a rapid, turbulent movement. The mass and turbulent movements of the slurry, as occasioned by the gas being bubbled upwardly therethrough, should be quite rapid so as to facilitate the dispersion of the cork granules and whatever substances may be added to the slurry, such as wetting agents, coating materials and coagulants. As the gas bubbles to the surface of the liquid in the tank, it also expands to aid in the dispersion of the cork granules and additives.

The gas which is used is preferably air or nitrogen, or some similar gas which is substantially insoluble in water and has no chemical effect upon the cork granules, or slurry additives. However, there may be occasions when a gas may be chosen for its chemical activity, such as chlorine, so as to obtain a particular result. It is preferred, however, to use air because it may be compressed and filtered without requiring large storage tanks, as would be the case with nitrogen. It is important that the gas be free from dust, dirt and other impurities, and for this reason the gas is carefully filtered before being bubbled into the slurry. The gas is admitted to the tank in such a manner and at such a rate as to obtain rapid dispersion of the cork granules and slurry additives. The cork slurry is subjected to rapid, mass turbulent movement which has the effect of keeping the cork granules well dispersed within the liquid and at the same time provides for rapid, if not substantially instantaneous, dispersion of latex, coagulants and any other substances which may be introduced into the slurry during agitation.

After the cork granules are placed in the agitation tank with water in the proportions heretofore stated so as to produce a cork slurry having a cork concentration by weight of not more than about 2% and preferably less than about 1%, the slurry is agitated, as above described. Due to the chemical nature of cork, it is desirable to add a wetting agent to the slurry at this stage of the process in order to wet the surfaces of the cork granules and facilitate their immersion and dispersion in the water. For adequate coating, it is important that all surfaces of the cork granules be completely wetted by water.

A variety of wetting agents may be used, as for example, Aerosol OT which is composed of dioctyl-sodium-sulfosuccinate and made by American Cyanamid and Chemical Corp., or Tergitol Penetrant which is composed of sodium alkyl sulfonates and made by Carbide and Carbon Chemicals Co. The particular wetting agent used is purely a matter of choice.

Again, by way of example, when using Tergitol Penetrant, one gram of a 25% concentration wetting agent per 4000 grams of water has been found to be satisfactory.

Inasmuch as the cork granules, even though adequately wetted with water, with or without the aid of a wetting agent, will nevertheless float on the surface of the water due to the imprisoned air within the cells of the cork granules, it is necessary to control the rate of gas admission and the pattern of agitation so that the cork granules are satisfactorily dispersed within the slurry. There is no hard and fast rule for determining the rate of gas agitation other than by careful observance of the slurry itself during its agitation, and there must be sufficient gas agitation, either by reason of the number and size of gas outlets, or the pressure or volume of gas discharged therethrough, or both, so that both the top surface of the slurry and the mass of the slurry are in a constant state of ebullience, with the result that any cork granules that reach the surface of the slurry are immediately drawn downwardly into the slurry and dispersed therewithin. On the other hand, excessive agitation is to be avoided, since this would interfere with the deposition of the coating on the cork granules and its adherence thereto.

One effect of using the relatively high rate of gas agitation for cork granules is the tendency to push the light cork granules to the side wall of the tank where they have a tendency to accumulate, and it is desirable to continuously free the side walls of the tank of such cork granules by the use of appropriate means, such as an inclined scraper blade, air jets or water sprays. Accumulation of cork granules is, of course, above the surface of the water, so that the function of the wiper, jet or spray is merely to dislodge the cork particles from the side wall and return them into the ebullient slurry.

After the cork slurry has been formed in the tank and gas agitation has begun, with the granules being thoroughly wetted with water by the aid, if necessary, of a wetting agent, as hereinbefore-described, it is then desirable to introduce polyvalent cations into the slurry in order to condition the cork granules for the reception of the coating material. The polyvalent cations may be introduced in the form of water-soluble salts of calcium, aluminum, thorium, or the like, and I have found that aluminum is satisfactory in most cases. For convenience in terminology, these water-soluble polyvalent cation salts may be called coagulants because they do aid in effecting good deposition of coating material on the cork granules.

It is significant that when coating pulp fibers according to the process disclosed in my prior application, Serial No. 51,294, the preconditioning of the pulp fibers in the slurry with coagulant required but five or ten minutes of agitation, but in the present process for coating cork granules, the preliminary coagulant treatment before the addition of latex or emulsion requires a substantially longer time—usually on the order of thirty minutes or more, unless such time is shortened by heating or other means. The reason for this is believed to be due to the fact that in pulp slurries, the pulp fibers already have a negative charge due to the near colloidal size of their diameters, and hence when the polyvalent cations are introduced into the slurry in the form of water-soluble salts, the negatively charged fibers readily attract the positive ions and set up a positive charge on the surface of the fibers for attracting the negatively charged coating material when it is introduced into the slurry in the form of an emulsion.

In the case of cork granules, however, and particularly when the granules are of a size ranging from 25 to even 200 mesh or less, the granules are well outside of the colloidal range, and hence it is believed that they do not carry any appreciable electrical charge. Hence, the observed fact that thirty minutes or more of agitation of the cork slurry in the presence of polyvalent cations is required for properly preconditioning the granules for the reception of the coating. It may possibly be explained from a theoretical standpoint by the fact that the cork granules do not carry an electrical charge and their acquisition of a positive charge by the action of the polyvalent cations must depend solely upon adsorption of the cations by the cork granules. Whether this is the correct explanation of the physical phenomena known to exist is not important, for the fact remains that in the case of cork granules it is necessary for the cork slurry to be agitated in the presence of the polyvalent cations for a period of not less than about thirty minutes in order to achieve the desired results, and throughout this specification and the appended claims, this approximate period of thirty minutes shall be assumed to be at normal room temperature with the time factor being correspondingly reduced if other means are employed for accelerating the preconditioning of the cork granules.

The amount and concentration of the particular coagulant that is used varies with the different emulsions and latices and with the pH of the water. Preferably, sufficient coagulant is added so as to bring the pH of the slurry after the addition of the coating materials to approximately neutral or slightly acid.

While all the coagulant can be added at one time, it is preferable that the coagulant be added in two portions, the first portion containing less than the calculated amount of coagulant required, and the second portion containing the remainder of the coagulant but substantially diluted. It is preferred that the first portion of coagulant be between 25% and 75% of the amount required, depending upon the nature and character of the cork granules, the emulsion and the pH of the water.

After the conditioning of the slurry with coagulant, the emulsion or latex is added at such a rate that it will rapidly disperse into the cork slurry. To accomplish this most effectively, the emulsion or latex should be fed directly into the center or centers of the agitation, either in drops or in a small stream.

The emulsion, latex or other coating material may or may not require the use of stabilizers such as ionizable or non-ionizable soaps or protective colloids, such as casein, glue or haemoglobin. The emulsion, or latex preferably, is diluted to a concentration of between 2% to 10% by weight of solids, although higher or lower concentrations in some cases appear to be satisfactory.

The emulsion or latex used depends, of course, upon the particular coating that is to be applied to the cork granules and fibrous material in the slurry, and, purely by way of example, the latex may be Buna synthetic rubber type III (namely, G.R.S. synthetic rubber type III).

After all the emulsion or latex has been added into the cork granules dispersion system, dilute coagulant is then added to exhaust the emulsion or the latex. Preferably, the coagulant for this step is roughly three to six times more dilute than the coagulant originally added. Because of the presence of resin or rubber particles in the dispersion, the addition of the coagulant must be done carefully to prevent local coagulation, and it is added slowly while the cork granules are kept in dispersion by means of the gas agitation. After the addition of the dilute coagulant, the water phase of the cork granules dispersion should be free from any emulsion or latex, and the success of the process can be visually evaluated by the clarity of the water.

In some instances, it may be desirable to add curing agents such as antioxidants, activators, sulphur and accelerators in the form of aqueous dispersions in a manner well-known in the art.

Cork granules treated according to this process will be coated substantially all over their entire surface and also will be individually separated from each other.

It has already been stated that the cork granules may be as large as 25 mesh or they may be considerably smaller in particle size. The cork slurry should not be more than about 2% by weight in concentration and preferably less than about 1%. The particular type of wetting agent used in the slurry is not important, as any suitable commercial wetting agent may be used, and only a sufficient amount is used to accomplish the desired wetting of the granules.

The gas agitation required for my process is substantially greater than that required when dealing with pulp slurries, as described in my prior application, Serial No. 51,294, and by way of example, it might be said that if the bubbling gas rising to the surface of a pulp slurry forms a crest of say 1" when fibers are being coated according to my process as described in said copending application, then a crest of approximately 2" to 3" might normally be deemed necessary when a cork slurry is used instead of a pulp or fiber slurry. It should be noted that substantially greater gas agitation may be employed in cork slurries than in pulp slurries because of the discrete character of the cork granules. The cork granules can move more rapidly within the dispersion without mechanical abrasion than is possible with elongated fibers which tend to intertwine one another and rub off coatings.

The amount of coagulant used will depend upon the particular emulsion or latex which is to be introduced into the slurry for coating the cork granules, and persons skilled in the art will readily appreciate and be familiar with the quantities required for given emulsions and latices.

In order that the versatility of the process may be understood, a few examples of cork granules treated in accordance with the above process are as follows:

*Example No. 1*

| Material | Concentration, Percent | Dry Weight (Grams) | Wet Weight (Grams) |
|---|---|---|---|
| Cork Granules (Passing through 40 mesh) | | 20 | 20 |
| Water | | | 4,000 |
| Wetting Agent (Tergitol Penetrant) | 25 | 1.0 | 4 |
| Alum | 1 | 1.75 | 175 |
| Latex (Buna Synthetic Rubber, type III) | 10 | 30 | 300 |
| Coagulant (Alum) | 0.15 | | 1,700 |

Rubber content = 60%.
Cork content = 40%.

*Example No. 2*

| Material | Concentration, Percent | Dry Weight (Grams) | Wet Weight (Grams) |
|---|---|---|---|
| Cork Granules (Passing through 40 mesh) | | 20 | 20 |
| Water | | | 4,000 |
| Wetting Agent (Tergitol Penetrant) | 25 | 1.0 | 4 |
| Alum | 1 | 1.75 | 175 |
| Latex (Buna synthetic rubber type III) | 10 | 30.0 | 300 |
| P-33 Dispersion [1] | 60 | 10.0 | 16.7 |
| Cure Dispersion | 50 | 1.9 | 3.8 |
| Coagulant (Alum) | 0.15 | | 2,200.0 |

Rubber content = 48.5%.
Cork content = 32.3%.
Pigment and cure content = 19.2%.
[1] Carbon black manufactured by R. T. Vanderbilt Co.

*Example No. 3*

| Material | Concentration, Percent | Dry Weight (Grams) | Wet Weight (Grams) |
|---|---|---|---|
| Cork Granules (Passing through 40 mesh) | | 20 | 20 |
| Water | | | 4,000 |
| Wetting Agent (Tergitol Penetrant) | 25 | 1 | 4 |
| Alum | 1 | 1.75 | 175 |
| Latex (Buna synthetic rubber type III) | 10 | 26.1 | 261 |
| Paraplex G-50 Emulsion [1] | 10 | 3.9 | 39 |
| P-33 Dispersion | 60 | 10.0 | 16.7 |
| Cure Dispersion | 50 | 1.9 | 3.8 |
| Coagulant (Alum) | 0.15 | | 2,200 |

Rubber content = 42.2%.
Resin content = 6.3%.
Cork content = 32.3%.
Pigment and cure content = 19.2%.
[1] A high molecular weight polyester formed by reacting propylene glycol and adipic acid, manufactured by Rohm and Haas of Philadelphia, Pa.

*Example No. 4*

| Material | Concentration, Percent | Dry Weight (Grams) | Wet Weight (Grams) |
|---|---|---|---|
| Cork Granules (Passing through 40 mesh) | | 20 | 20 |
| Water | | | 4,000 |
| Wetting Agent (Tergitol Penetrant) | 25 | 1.0 | 4 |
| Alum | 1 | 1.5 | 150 |
| Latex (Buna synthetic rubber type III) | 10 | 6.6 | 66 |
| Coagulant (Alum) | 0.15 | | 950 |

Rubber content = 25%.
Cork content = 75%.

*Example No. 5*

| Material | Concentration, Percent | Dry Weight (Grams) | Wet Weight (Grams) |
|---|---|---|---|
| Cork Granules (Passing through 40 mesh) | | 20 | 20 |
| Water | | | 4,000 |
| Wetting Agent (Tergitol Penetrant) | 25 | 1.0 | 4 |
| Alum | 1 | 2 | 200 |
| Latex (Buna synthetic rubber type III) | 10 | 60 | 600 |
| Coagulant (Alum) | 0.15 | | 2,500 |

Rubber content = 75%.
Cork content = 25%.

It should be noted that by my new and improved process not only are the individual cork granules evenly, uniformly and substantially completely coated, but also it is possible for water to be drained out quickly with the aid of suction from the screen provided at the bottom of conventional moulds. Furthermore, due to the fact that the rubber latex particles coagulated on the cork granules by this new process do not occlude as much water as in the case of mass coagulation of rubber latex and cork granules mixture, the amount of water remaining in and on the individually coated cork granules will be relatively small and consequently the time required for drying the stock in the mould will be comparatively short.

One advantage of my process is that cork granules may be coated in the manner hereinabove described and then admixed with fibers which have been coated in the manner described in my copending application, Serial No. 51,294, or in any other way, after which the mixture of coated cork granules and coated fibers may be pressed into sheet form or moulded in any other form. Obviously, the proportion of coated cork granules to coated fibers may be made anything desired.

By this new process of coating cork granules and blending them with coated fibers, the following advantages are obtained:

(1) The cork granules may have a particle size as large as 25 mesh and, hence, the outstanding physical properties of the cork are retained and utilized in the final sheet product. In conventional fabrication of sheets made of coated fibers and coated cork granules, the cork granules are often of 200 mesh, or finer, and are blended in the fiber slurry and coated concurrently with the fibers.

(2) Since the cork granules and fibers are coated separately, there is no mixture of two physically different materials during the coating process. Therefore, the coating of the cork granules is uniform, as is also the coating of the fibers.

(3) Since the blending of the cork and fiber is carried out after the fiber and cork granules are separately coated, the flexibility of blending these two coated materials in any desirable proportion can be easily realized.

(4) Since the coating of the fiber and the cork granules is carried out separately, the coating of cork granules does not depend on the possibility of having the latex carry the cork particles onto the fiber. After blending, these two materials will be coexisting in the blend slurry.

In the foregoing examples, the following particularization of trade name ingredients and generic term ingredients is noted:

Cure dispersion: Any suitable, well known cure dispersion may be used, as, for example, one consisting of 5 parts by weight of zinc oxide, 2 parts by weight of sulphur, 1 part by weight of phenyl-beta-naphthalamine (used as an anti-oxidant), and 1½ parts by weight of benzothiazyl disulphide (used as an accelerator).

Tergitol Penetrant: Sodium tetradecyl sulphate.

I claim:

1. The process of substantially uniformly coating coarse cork granules having a particle size greater than about 200 mesh and less than about 25 mesh, which consists in making an aqueous slurry of the granules with the slurry having a concentration of not more than about 2% by weight of said cork granules, subjecting the slurry continuously to rapid turbulent mass agitation by bubbling upwardly therethrough a gas whereby the granules are continuously dispersed in the slurry by the expanding gas bubbling therethrough, preconditioning the granules for the reception of coating material by adding a coagulant to the ebullient slurry in the form of a water-soluble salt of a polyvalent metal and permitting the slurry to be thus agitated in the presence of said salt for a period of not less than about thirty minutes, and then slowly adding to the ebullient slurry a coating material of rubber latex in the form of an emulsion whereby the dispersed granules are uniformly coated with the coating material.

2. The process as set forth in claim 1 in which a wetting agent is added to the ebullient slurry prior to the addition of the preconditioning coagulant.

3. The process as set forth in claim 1 in which the gas agitation is sufficient to maintain the cork granules dispersed within the slurry.

4. The process as set forth in claim 1 in which a more dilute coagulant is added to the ebullient slurry after the coating of the granules has commenced to thereby achieve substantially 100% retention of the coating material by the granules.

5. The method of preparing a cork composition which consists in separately coating cork granules with a coating material of rubber latex and then admixing said coated cork granules with fibers which have been similarly separately coated with a coating material.

6. A cork composition which consists of fibrous material individually and substantially uniformly coated with rubber latex and cork granules also individually and substantially uniformly coated with rubber latex, with the cork granules having a size before coating greater than about 200 mesh and less than about 25 mesh.

7. A cork composition which consists of cork granules the greater mass of which have a particle size ranging from about 25 mesh to about 200 mesh and fibrous material, the cork granules and the fibrous material being individually and substantially uniformly coated with rubber latex.

8. In the process of coating cork granules, the improvement which consists in taking cork granules of 25 mesh or finer, making an aqueous slurry of the granules with the slurry having a concentration of not more than about 2% by weight of said cork granules, subjecting the slurry continuously to rapid turbulent mass agitation by bubbling upwardly therethrough a gas whereby the granules are continuously dispersed in the slurry by the expanding gas bubbling therethrough, preconditioning the granules for the reception of coating material by adding a coagulant to the ebullient slurry in the form of a water-soluble salt of a polyvalent metal and permitting the slurry to be thus agitated in the presence of said salt for a period of not less than about thirty minutes, and then slowly adding to the ebullient slurry a coating material of rubber latex in the form of an emulsion whereby the dispersed granules are uniformly coated with the coating material.

References Cited in the file of this patent

UNITED STATES PATENTS

| | | |
|---|---|---|
| 174,260 | King | Feb. 29, 1876 |
| 722,626 | Reif | Mar. 10, 1903 |
| 1,189,780 | Beindorff | July 4, 1916 |
| 1,591,018 | Cutler | July 6, 1920 |
| 1,883,106 | Thoma | Oct. 18, 1932 |
| 1,964,806 | Barnett | July 3, 1934 |
| 2,278,684 | Asbury et al. | Apr. 7, 1942 |
| 2,463,952 | Cooke | Mar. 9, 1949 |
| 2,666,699 | McQuisten et al. | Jan. 19, 1954 |
| 2,676,099 | Kao | Apr. 20, 1954 |

FOREIGN PATENTS

| | | |
|---|---|---|
| 441,765 | Great Britain | Jan. 21, 1936 |